July 6, 1965           L. A. EVANS           3,193,467
REACTOR CONTROL
Filed April 19, 1950           3 Sheets-Sheet 1
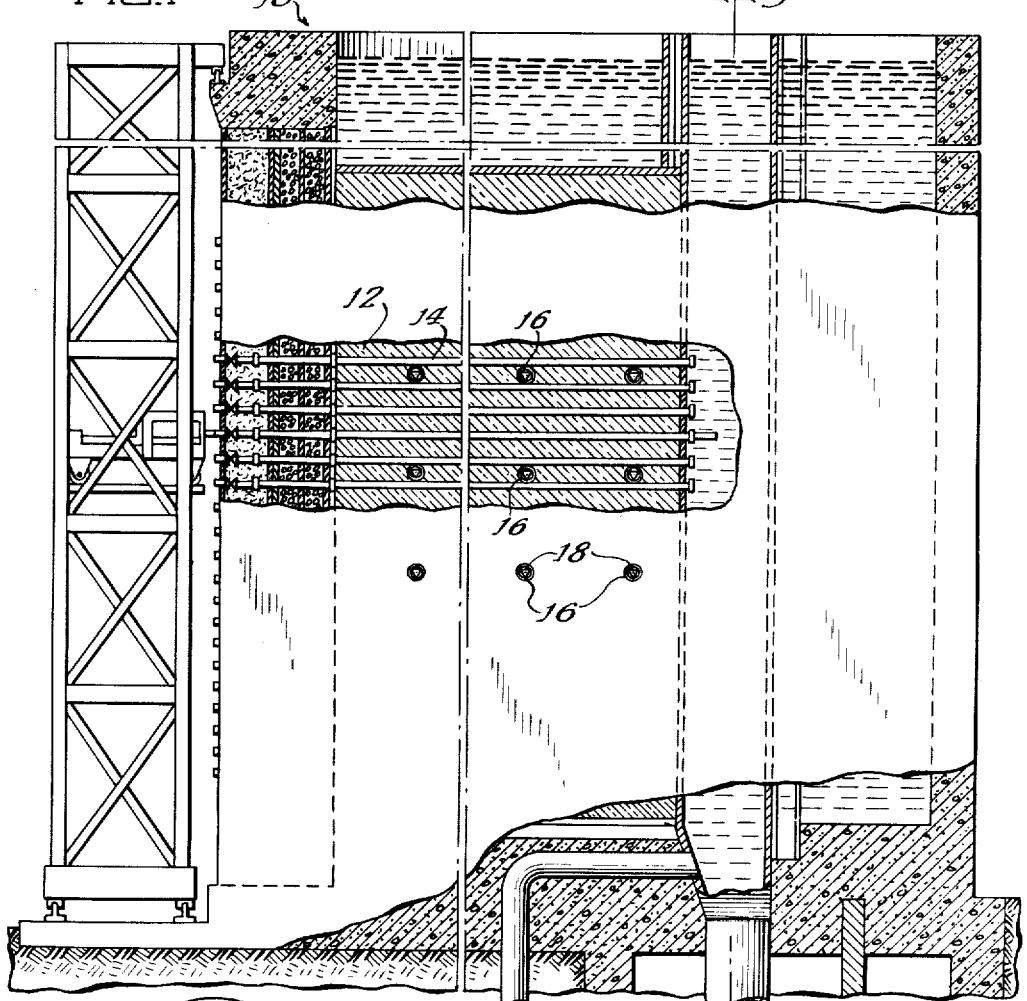
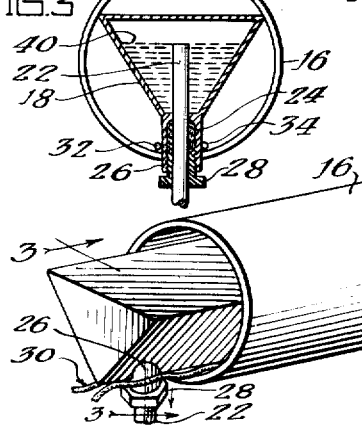
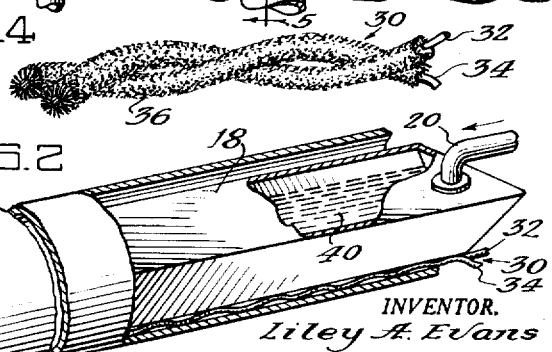
INVENTOR.
Liley A. Evans
BY
Roland A. Anderson
Attorney July 6, 1965 L. A. EVANS 3,193,467
REACTOR CONTROL
Filed April 19, 1950 3 Sheets-Sheet 2

INVENTOR.
Liley A. Evans
BY
Roland Q. Anderson
Attorney

United States Patent Office 3,193,467
Patented July 6, 1965

3,193,467
REACTOR CONTROL
Liley A. Evans, Schenectady, N.Y., assignor to the United States of America as represented by the United States Atomic Energy Commission
Filed Apr. 19, 1950, Ser. No. 156,856
7 Claims. (Cl. 176—22)

The present invention relates to the control of neutronic reactors and particularly to control by introducing into or withdrawing from the reactor a solution of boron or similar neutron absorbent material.

A self-sustaining chain reaction in a neutronic reactor may be instigated by a neutron released by an isotope which is thermally neutron fissionable (fissionable by thermal neutrons, hereinafter sometimes referred to merely as "fissionable"), such as $U^{233}$, $U^{235}$, or $Pu^{239}$. The released neutron reacts with another fissionable atom splitting it into two atoms of lesser weight and releasing approximately 2.3 (in the case of $U^{235}$) new neutrons. These may be identified as first generation neutrons. Some of these first generation neutrons are lost in parasitic reactions, such as absorption in the moderator or impurities. Some are lost to the reaction in capture by "fertile" atoms (atoms of isotopes which are converted to fissionable isotopes by neutron capture), if any are present. The remainder react with fissionable atoms to yield second generation neutrons. Manifestly, if there are not too many parasitic and other non-fission reactions, the number of second generation neutrons will be greater than the first. With repeated reactions the neutron population increases exponentially unless some event occurs to inhibit growth by reducing the number of neutrons born in a given generation to a number equal to or less than that born in the preceding generation. Such an event may be either the depletion of the supply of fissionable atoms, or an increase in one of the parasitic reactions. The latter may be accomplished by introducing into or withdrawing from the pile a neutron absorbent substance, such as boron. On the one hand by introducing the absorber into the reactor the neutrons are absorbed and thereby the reaction subsides. On the other hand by withdrawing the absorber, the neutrons remain free to impinge upon fissionable atoms whereby the reaction may grow.

The relationship between the number of neutrons produced in a reactor in a given generation and the number produced in the preceding generation is a ratio which is called the reproduction or multiplication ratio which is denoted by the symbol $r$. Obviously, where the number of neutrons produced exactly equals the preceding generation, $r$ equals unity. Where the number of produced neutrons is less than the preceding generation, $r$ is less than unity, indicating a decelerating reaction. Where, however, the number of neutrons is increasing, $r$ is greater than unity.

It is the primary purpose of the present invention to provide an improved structure for control of the neutron reproduction ratio of the reactor. It is a further purpose to provide such a structure wherein there is employed a liquid neutron absorber, but which avoids the problems of heat removal and deterioration heretofore encountered with liquid neutron absorbers for control purposes.

The present control device is of the type employing a parasitic absorption reaction to control the neutron activity. This is accomplished by moving a solution of a fixed percentage of boron or other suitable element through a tube of V-shaped cross-section which is disposed horizontally in the reactor. The V cross-section increases the sensitivity of the control in that the volume of the solution can be varied greatly in response to a relatively slight change in the depth. This variation of depth may be effected in various ways. In the particular embodiment herein described the depth is regulated from the control room through a weir located at the end of the tube opposite the inlet. Since the mechanism for such remote regulation may be either electrical, mechanical, or hydraulic, or a combination of these, as would occur to one skilled in the art, and per se is not a part of the invention, it is not shown in the drawings. Absorber elements other than boron may be used provided they are in sufficiently soluble form. The solution enters at one end of the tube and exits at the other end. Two leak detector wires are mounted on the lower vertex on the exterior of the tube to detect any leaks in the tube. The wires are separated by absorbent material which causes a short circuit between the wires when moistened and gives an alarm in the control room whenever the solution leaks through the tube. This feature is essential in order to avoid contamination of the reactor by the escaping solution in the event of ocurrence of a leak.

By using this type of tube some of the problems inherent in the use of a rigid control member are avoided. In particular the advantages of handling liquid as compared with long rigid rods are available without the difficulties heretofore met in employing liquid control devices. The amount of solution flowing through the tubes may be increased, decreased or maintained constant according to the control requirements. When greater neutron absorption is required, it may be had by simply increasing the depth of solution in the tubes. Thus, more neutrons are absorbed. Likewise, when it is desirable to decerase the absorption of neutrons, less solution is permitted to remain in the tubes. Another aspect of this invention is the incorporation of a tube flared at the center of the reactor where the neutron flux and generation of heat are the greatest. The flared tube presents a greater surface and volume of solution to the reactor, which flattens the neutron flux distribution curve of the reactor, thus enabling operation at power levels which are high compared to the maximum power levels otherwise permitted, since the maximum permissible power level is dictated by the temperature at the hottest portion of the reactor.

A number of possible embodiments of the invention may be conceived and the one to be described is shown in the drawings in which:

FIGURE 1 is a schematic fragmentary side elevation partly in section illustrating a neutronic reactor;

FIGURE 2 is a perspective view of a control conduit together with a V tube to be described hereinafter;

FIGURE 3 is a cross-sectional view partly in elevation taken on the line 3—3 of FIGURE 2;

FIGURE 4 is a perspective view of a leak detector to be described hereinafter;

Figure 5:
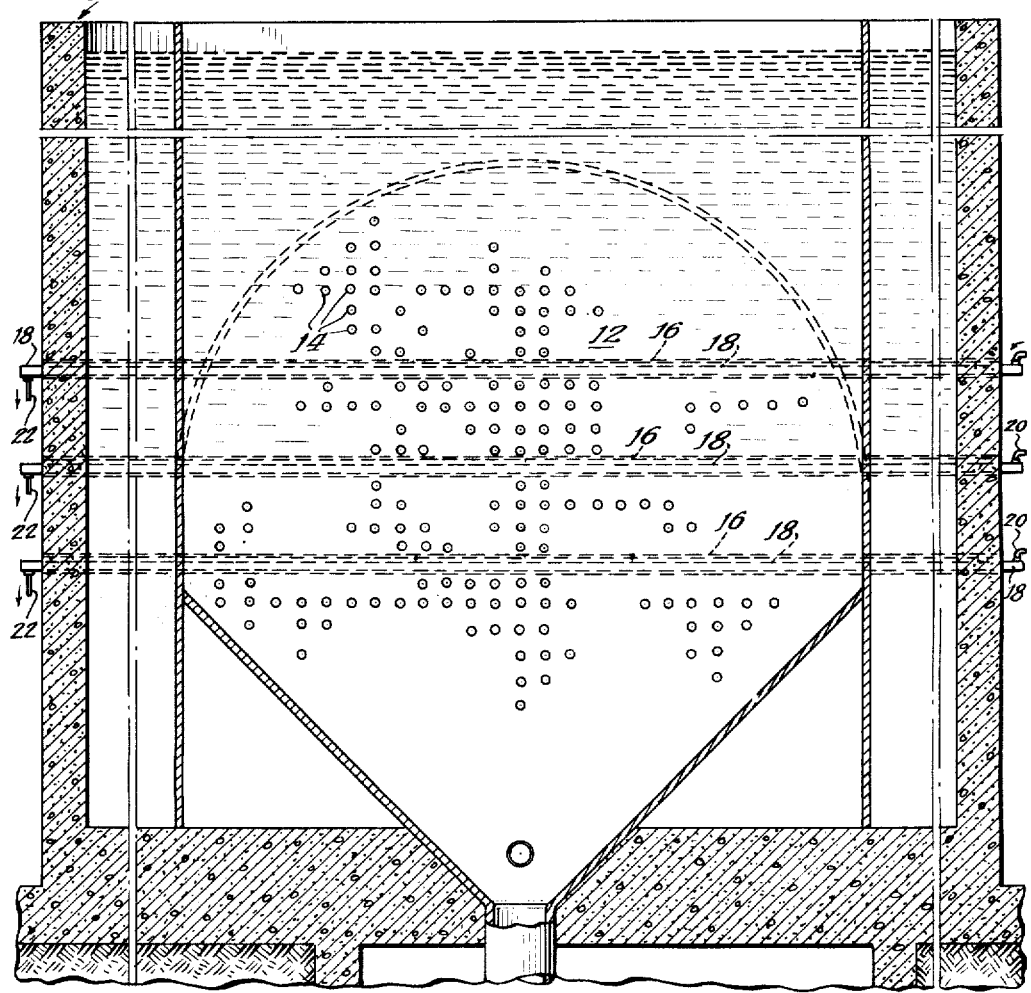
FIGURE 5 is a cross-sectional view partly in elevation taken as indicated by the line 5—5 in FIGURE 1.

Referring first to FIGURES 1 and 5, a neutronic reactor is generally indicated at 10, comprising a graphite moderator 12 and a series of tubes 14 of fissionable material. For a more complete description of the particular type of reactor illustrated reference is made to the copending application of Leo A. Ohlinger, Alvin M. Weinberg, Eugene P. Wigner and Gale J. Young, Serial No. 568,900, filed December 19, 1944, now Patent No. 2,890,158, dated June 9, 1959.

Figure 6:
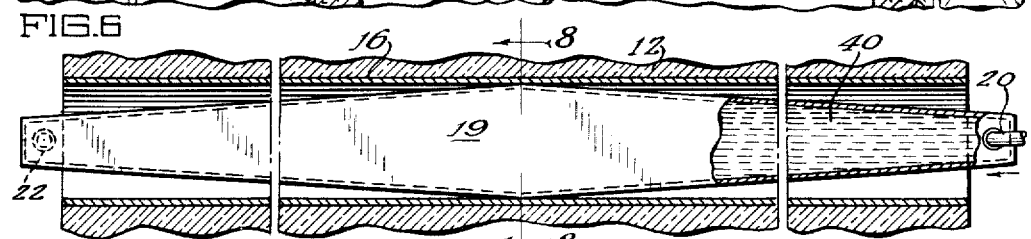
FIGURE 6 is a horizontal sectional view partly in elevation of a control conduit together with a V tube which is flared at the center thereof.

As shown in FIGURES 1 and 5 a plurality of cylindrical conduits 16 are disposed horizontally within the graphite moderator 12 and between the tubes 14. The conduits 16 extend from one side of the reactor to the other as shown in FIGURE 5. Within each conduit 16 a tube 18 having a V cross-section is disposed longitudinally therethrough, each end of which extends beyond the ends of the conduit 16 as shown in FIGURES 2 and 6. The tube 18, shown in FIGURES 2 and 3, has a constant V cross-section throughout its length. There may advantageously be substituted for the tube 18 of constant cross-section a tube 19, shown in FIGURES 6, 7 and 8, flared centrally thereof, the purpose of which will be set forth hereinafter. At one end of the tubes 18 and 19 an intake nozzle 20 is provided while at the other end a vertically adjustable weir 22 is attached. As shown in FIGURE 3 the weir 22, which is similar for both tubes 18 and 19, is provided with packing 24 which is kept in place within a weir housing 26 by a packing nut 28. Adjustment of the weir may be made by manual means, or by remote control from the control room. Neither of these is shown in the drawings for it is not part of the invention.

Between the tube 18 or 19 and the conduit 16 is a leak detector generally indicated at 30. The detector 30 is shown in detail in FIGURE 4 and comprises two wires 32 and 34 wound with moisture absorbing material 36 and twisted together. The wires are connected to an alarm system not shown in the drawing.

A solution 40 of neutron absorbing material is contained in the tube 18 or 19. The solution should contain one or more of the following elements: lithium, cadmium, boron, indium, chlorine, samarium, cobalt, europium, rhodium, gadolinium, dysprosium, iridium and mercury. These elements may be present with solutions combined with other elements, so as to have, for example, an aqueous solution of a soluble salt of the element. Any fluid composition embodying the neutron absorbing characteristics necessary for a given reactor may be used.

Operation of the device of this invention consists of controlling the neutron density by flowing a solution of neutron absorbing material through the tube 18 or 19. The solution 40 enters through the inlet 20 and is removed through the weir 22. The amount of absorption derived thereby is determined by the depth of the solution 40 in the tube 18 or 19. The volume of solution 40 varies as the square of the depth. In turn the depth in the tube is governed by the distance of the top of the weir 22 from the vertex of the V tube.

Figures 7, 8:
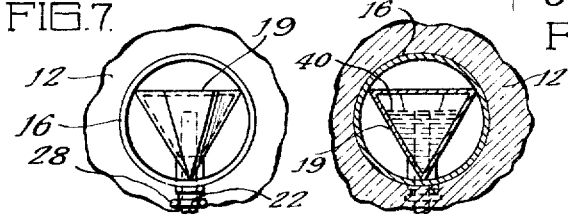
FIGURE 7 is an end view of a V tube and conduit shown in FIGURE 6.
FIGURE 8 is a cross-sectional view taken on the line 8—8 of FIGURE 6.
Figure 9:
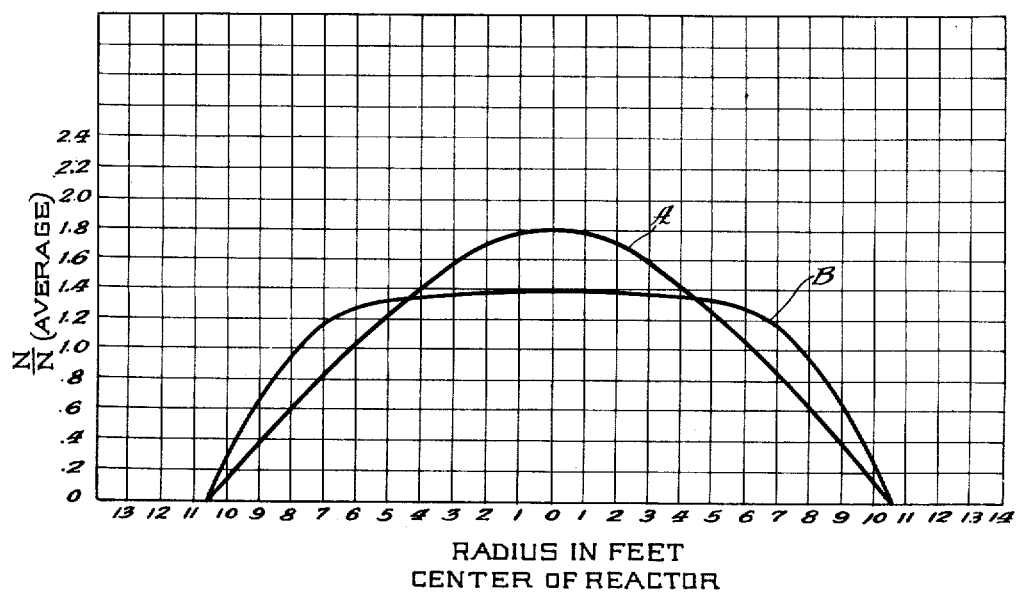
FIGURE 9 shows curves which indicate the ratio of the number of neutrons at a given point in the reactor to the average number of neutrons in the entire reactor as ordinates plotted against the distances from the center of the reactor as abscissae.

As shown in FIGURE 2, the tube 18, which has a uniform cross-section throughout, offers uniform control across the reactor. The neutron distribution curve within a reactor resembles a cosine curve shown by curve A in FIGURE 9, the ordinate of which is the ratio of local neutron density to the average neutron density and the abscissa of which is the radial distance from the center of the reactor. It is evident that the neutron density is maximized at the center of the reactor. When a maximum temperature is dictated by such factors as the melting points of materials employed, etc., the total power output of the reactor is limited by the central reactor activity. As shown in FIGURES 6 and 7, the tube 19, being flared centrally of the reactor, offers varying absorption across the reactor. At the center where the tube 19 is flared a greater degree of absorption is had than at either end where the cross-section is smaller. Hence, at a given time, the volume of solution 40 at the center is greater than at either end. Here the depth of the solution 40 may be regulated by vertical adjustment of the weir 22 similarly to tube 18. In this manner the reproduction factor is lower at the center of the reactor than at the outer zone thereof and the reactor activity is no longer represented by a cosine curve A. Rather the curve may be "flattened" as shown by curve B in FIGURE 9, indicating a substantially constant neutron density throughout the reactor. The output in either case is represented by the area under the curve. The "flattening" of the neutron density curve is not in itself broadly new, for it is shown and claimed in the copending application of Gale J. Young, Serial No. 552,730, filed September 5, 1944, now Patent No. 2,774,730, dated December 18, 1956. However, the use of the flared V tube of the type shown together with the solution 40 of neutron absorbing material to accomplish both control and flattening is believed to be novel.

In the event that a leak should occur in either tube 18 or 19, the absorbent material 36 on the leak detector wires 32 and 34 will pick up the smallest amount of moisture, causing a short circuit between the wires 32 and 34 to give an alarm in the control room. A leaking tube may then be disconnected from standard pipe connections at each end and replaced to avoid contamination of the reactor.

It is to be noted that heat generated in the solution 40 by neutron absorption is removed by the constant flow of the solution.

It will be apparent to those skilled in the art that these and other modifications may be made without departing from the scope of the invention as set forth in the appended claims.

What is claimed is:

1. In a neutronic reactor comprising fissionable material in an amount and concentration sufficient to sustain a neutronic reaction, and a variable amount of a neutron absorbing material in the reactive region adapted to control the reaction, the improvement wherein there is at least one tube horizontally disposed in said active region, said neutron absorbing material comprising a solution contained in the tube, means for supplying the solution into the tube, and means for adjusting the depth of the solution in the tube, whereby the level of the solution may be adjusted in accordance with the requirements of the reactor.

2. In a neutronic reactor comprising fissionable material in an amount and concentration sufficient to sustain a neutronic reaction, and a variable amount of a neutron absorbing material in the reactive region adapted to control the reaction, the improvement wherein there is at least one tube having a V cross-section horizontally disposed in said active region, said neutron absorbing material comprising a solution contained in the tube, means for supplying the solution into the tube, and means for adjusting the depth of the solution in the tube, whereby the level of the solution may be adjusted in accordance with the requirements of the reactor.

3. In a neutronic reactor comprising fissionable material in an amount and concentration sufficient to sustain a neutronic reaction, and a variable amount of a neutron absorbing material in the reactive region adapted to control the reaction, the improvement wherein there is at least one tube having a V cross-section, said tube being flared centrally of the reactor whereby the neutron absorption is greatest in the region of maximum neutron density, said neutron absorbing material comprising a solution in the tube, means for supplying the solution into the tube, and means for adjusting the depth of the solution in the tube, whereby the level of the solution may be adjusted in accordance with the requirements of the reactor.

4. In a neutronic reactor comprising fissionable material in the moderator in an amount and concentration sufficient to sustain a neutronic reaction, and a variable amount of a neutron absorbing material in the reactive region adapted to control the reaction, the improvement wherein there is at least one tube horizontally disposed in said active region, said neutron absorbing material comprising a solution, means for supplying the solution into the tube, and a weir within the tube for adjusting the solution level in the tube, whereby the level of the solution may be adjusted in accordance with the requirements of the reactor.

5. In a neutronic reactor comprising fissionable material in the moderator in an amount and concentration sufficient to sustain a neutronic reaction, and a variable amount of a neutron absorbing material in the reactive region adapted to control the reaction, the improvement wherein there is at least one tube having a V cross-section horizontally disposed in said active region, said neutron absorbing material comprising a solution contained in the tube, means for supplying the solution into the tube, and a weir within the tube for adjusting the solution level in the tube, whereby the level of the solution may be adjusted in accordance with the requirements of the reactor.

6. In a neutronic reactor comprising a graphite mass, bodies of uranium in the mass in an amount and concentration sufficient to sustain a neutronic reaction, and a variable amount of a neutron absorbing material in the reactive region adapted to control the reaction, the improvement wherein there is at least one conduit horizontally disposed in said active region, a tube having a V cross-section disposed within the conduit, said tube being flared centrally of the reactor whereby the neutron absorption is greatest in the region of maximum neutron density, said neutron aborbing material comprising a solution of boron, means for supplying the solution into the tube, a weir within the tube for adjusting the solution level in the tube, whereby the level of the solution may be adjusted in accordance with the requirements of the reactor, a leak detector consisting of two wires wound with moisture absorbing material and twisted together, which is laid between the tube and the conduit, whereby the absorbing material absorbs moisture from possible leaks in the tube and causes a short circuit between wires.

7. In a neutronic reactor comprising fissionable material in an amount and concentration sufficient to sustain a neutronic reaction, and a variable amount of a neutron absorbing material in the reactive region adapted to control the reaction, the improvement wherein there is at least one conduit horizontally disposed in said active region, a tube having a V cross-section disposed within the conduit, said tube being flared centrally of the reactor whereby the neutron absorption is greatest in the region of maximum neutron density, said neutron absorbing material comprising a liquid solution containing at least one element from the group consisting of Li, Cd, B, In, Cl, Sm, Co, Eu, Rh, Gd, Dy, Ir, and Hg, means for supplying the solution into the tube, a weir within the tube for adjusting the solution level in the tube, and a leak detector consisting of two wires wound with moisture absorbing material and twisted together, which is laid between the tube and the conduit, whereby the absorbing material absorbs moisture from possible leaks in the tube and causes a short circuit between the wires.

References Cited by the Examiner

FOREIGN PATENTS 861,390 10/40 France.
233,011 10/44 Switzerland.

OTHER REFERENCES

Kelly et al.: Phy. Rev. 73, 1135–9 (1948).
Smyth: "Atomic Energy for Military Purposes," August 1945.

CARL D. QUARFORTH, *Primary Examiner.*

JAMES L. BREWRINK, *Examiner.*